T. W. BELL.
LOCKING MECHANISM.
APPLICATION FILED MAR. 8, 1922.
1,427,934.
Patented Sept. 5, 1922.
2 SHEETS—SHEET 1.
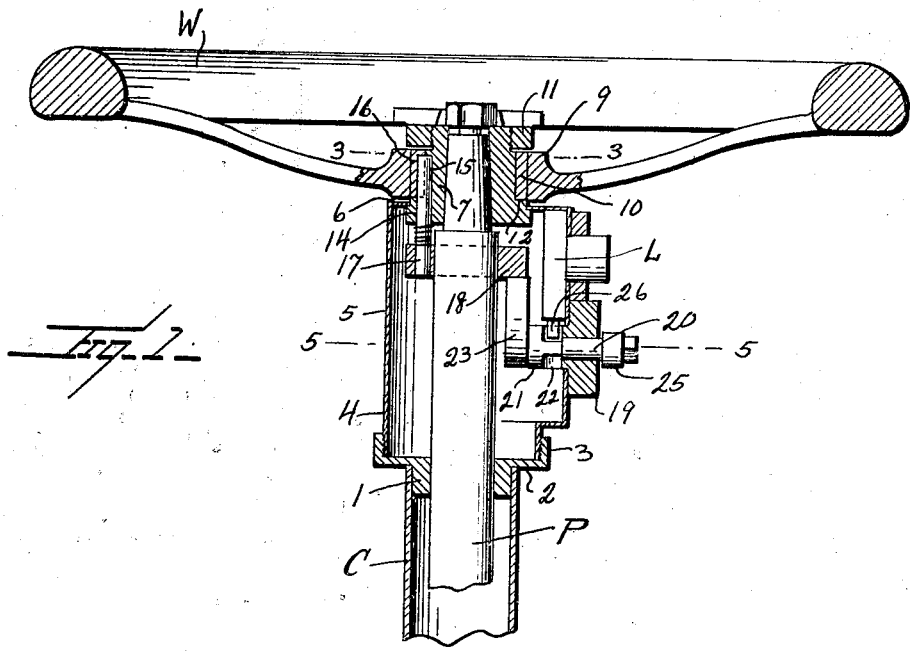
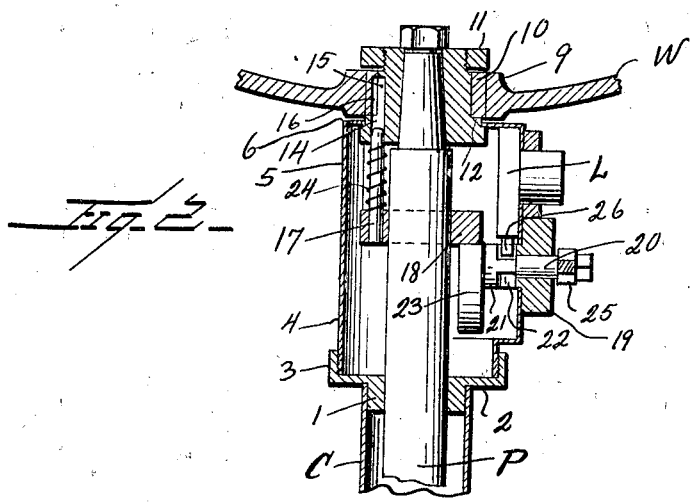
Inventor
T. W. Bell
By Watson E. Coleman
Attorney

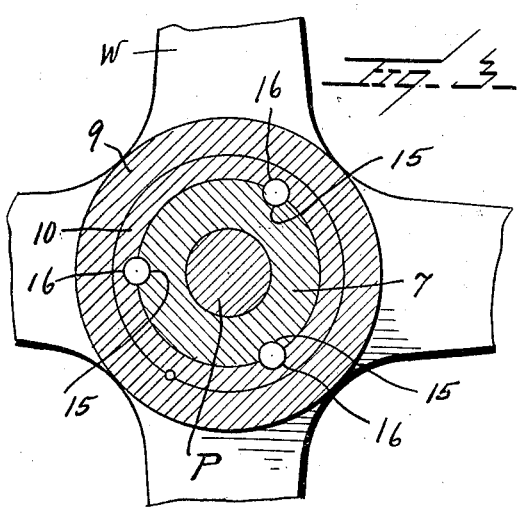
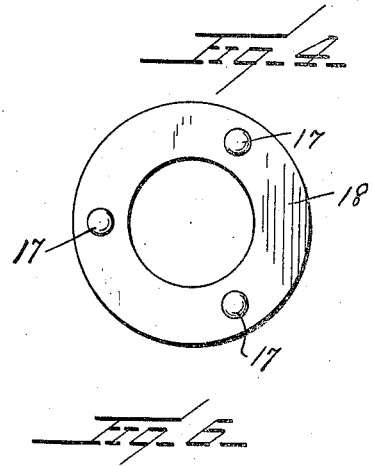
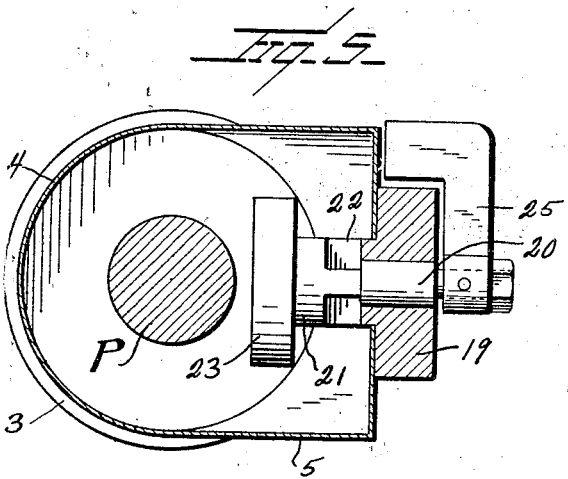
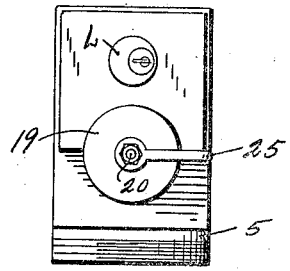
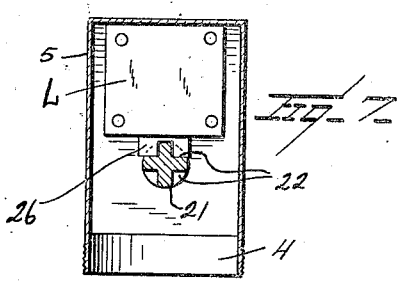
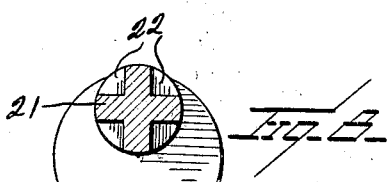

Patented Sept. 5, 1922.

1,427,934

UNITED STATES PATENT OFFICE.

THOMAS W. BELL, OF PORTLAND, OREGON.

LOCKING MECHANISM.

Application filed March 8, 1922. Serial No. 541,971.

*To all whom it may concern:*

Be it known that I, THOMAS W. BELL, a subject of the King of England, residing at Portland, in the county of Multnomah and State of Oregon, have invented certain new and useful Improvements in Locking Mechanisms, of which the following is a specification, reference being had to the accompanying drawings.

This invention relates to certain improvements in locking mechanisms and has relation more particularly to a mechanism of this general character especially designed and adapted for use in connection with the steering wheels of automobiles and kindred vehicles, and it is an object of the invention to provide a novel and improved mechanism of this general character wherein the steering wheel is rendered inoperative, thereby minimizing the possibility of an automobile being taken by an unauthorized person.

Another object of the invention is to provide a novel and improved mechanism of this general character wherein a locking member is slidably supported upon the steering post and movable into and out of engagement with the steering wheel so that said steering wheel may be keyed for rotation with the steering post or the steering wheel caused to rotate freely about said post, as desired.

An additional object of the invention is to provide a novel and improved mechanism of this general character under control of a key-operated lock, said mechanism being so constructed that the key applied within the lock can only be withdrawn when the sliding locking member comprised in the mechanism is in one of two positions.

The invention consists in the details of construction and in the combination and arrangement of the several parts of my improved locking mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in section and partly in elevation illustrating a locking mechanism constructed in accordance with an embodiment of my invention;

Figure 2 is a fragmentary view partly in section and partly in elevation illustrating my improved mechanism with certain of the parts in the second position;

Figure 3 is an enlarged fragmentary section taken substantially on the line 3—3 of Figure 1;

Figure 4 is a view in top plan of the sliding member and pins carried thereby unapplied;

Figure 5 is an enlarged fragmentary sectional view taken substantially on the line 5—5 of Figure 1;

Figure 6 is a fragmentary view in front elevation of the case or jacket showing the manual means for rotating the eccentric as herein disclosed and the position of the lock;

Figure 7 is a sectional view taken through the structure as illustrated in Figure 6;

Figure 8 is a view partly in elevation and partly in section illustrating the eccentric and the shaft associated therewith, said eccentric being shown in its lowermost position.

As disclosed in the accompanying drawings, P denotes the steering post which extends in a well known manner within and through the column C. The upper portion of the column C has engaged therein a bearing 1 for the upper portion of the post P said bearing 1 being defined by the outstanding flange 2 terminating in the upwardly directed annular sleeve 3. Threaded within the sleeve 3 is the lower annular portion 4 of a casing or jacket 5 of required dimensions and which surrounds the upper portion of the post P.

The top wall 6 of the jacket or casing 5 has disposed therethrough and effectively secured thereto a bushing 7 keyed or otherwise fixed to the upper extremity of the post P, said post P extending within the bore of said bushing 7. The bushing 7 constitutes a mounting or axle for the steering wheel W, said steering wheel being loosely mounted on the bushing. The hub portion 9 of the steering wheel is provided with a skein or liner 10 preferably of steel. The wheel W is held upon the bushing 7 by the lock collar 11 threaded upon the upper or outer extremity of the bushing 7, the hub portion of the wheel W, when applied, having its movement inwardly or downwardly of the bushing 7 limited by contact with the annular shoulder 12.

The inner end of the bushing 7 is provided with a plurality of circumferentially spaced openings 14 continued by the grooves or channels 15 intersecting the peripheral portion of the bushing 7 about which the wheel W rotates. The grooves or channels 15 are adapted to register with the grooves or channels 16 produced in the inner wall of the hub of the wheel W or more particularly the skein or liner 10. When the grooves or channels 15 and 16 are in register, they are adapted to receive the pins 17 extending upwardly from the member or collar 18 slidably mounted upon the post P and located within the casing or jacket 5. When the pins 17 are disposed within the registering grooves or channels 15 and 16, the wheel W is locked to the bushing 7 so that the post P and wheel W are operatively connected to effect the desired steering operation. When the pins 17 are retracted from within the registering grooves or channels 15 and 16, the wheel W has free rotation upon the bushing 7 and is, therefore, rendered inoperative in so far as relates to effecting a steering operation.

Carried by a side wall of the casing or jacket 5 is a bushing 19 which provides a bearing for the shaft 20. Said shaft 20 has one end portion 21 extending within the casing or jacket 5, said portion 21 constituting an enlarged cylindrical head provided in its periphery with the openings or recesses 22. Formed with the head 21 is an eccentric 23 which underlies the member 18, the member 18 being constantly maintained in contact with the periphery of said eccentric 23 through the instrumentality of the expansible members 24 interposed between the member 18 and the inner end of the bushing 7. As herein disclosed, the expansible members 24 each comprises a coiled spring encircling a pin 17.

The shaft 20 also extends outwardly of the bushing or bearing 19 and secured to said outwardly extended portions is an operating lever 25, said lever providing means whereby the shaft 20 may be manually rotated to cause the eccentric 23 to force the member 18 toward the bushing 7 so that the pins 17 will enter within the registering grooves 15 and 16 or to permit the expansible members or springs 24 to move the member 18 in a direction to retract the pins 17 from within said registering grooves 15 and 16.

L denotes a lock mechanism mounted within the casing or jacket 5 and which includes a bolt 26 adapted to be extended to engage within an opening or recess 22, said openings or recesses being so positioned that the bolt 26 can only be received within one of said openings or recesses 22 when the member 18 is in a position either to free the pins 17 from the registering grooves 15 and 16 or to cause said pins 17 to be received within said registering grooves to effect the desired locking action.

The bolt 26, as herein disclosed, is key operated and as the bolt 26 can only be extended when the member 18 is in one of two positions, it will be at once understood that the operating key for the bolt 26 can only be removed under similar conditions. This is of importance as it will be assured, when the key is removed, that the wheel W is either locked for rotation with the post P or is capable of independent or free rotation relative to said post.

The pins 17 may be of any desired number but in the present embodiment of my invention these pins 17 are three in number and equidistantly spaced in a direction circumferentially of the member 18.

From the foregoing description it is thought to be obvious that a locking mechanism constructed in accordance with my invention is particularly well adapted for use by reason of the convenience and facility with which it may be assembled and operated, and it will also be obvious that my invention is susceptible of some change and modification without departing from the prinicples and spirit thereof and for this reason I do not wish to be understood as limiting myself to the precise arrangement and formation of the several parts herein shown in carrying out my invention in practice except as hereinafter claimed.

I claim:

1. A locking mechanism comprising, in combination with a steering post, a steering post column and a steering wheel, of a jacket secured to the upper portion of the column, a bushing extending through a wall of the jacket and fixed to the steering post, the steering wheel being mounted upon the bushing, opposed faces of the bushing and steering wheel being provided with grooves adapted to register, a member slidably mounted on the post within the jacket, a pin carried by said member and movable within the grooves of the bushing and wheel when said grooves are in register to lock the wheel to the bushing, and mechanical means for moving the member in a direction to position the pin within said registering grooves.

2. A locking mechanism comprising, in combination with a steering post, a steering post column and a steering wheel, of a jacket secured to the upper portion of the column, a bushing extending through a wall of the jacket and fixed to the steering post, the steering wheel being mounted upon the bushing, opposed faces of the bushing and steering wheel being provided with grooves adapted to register, a member slidably mounted on the post within the jacket, a pin carried by said member and movable within the grooves of the bushing and wheel when said grooves are in register to lock the wheel to the bushing, an eccentric supported within the jacket, the periphery of said eccentric contacting with the member, means exteriorly of the jacket for rotating the eccentric, and means for constantly urging the member toward the eccentric.

3. A locking mechanism comprising, in combination with a steering post, a steering post column and a steering wheel, of a jacket secured to the upper portion of the column, a bushing extending through a wall of the jacket and fixed to the steering post, the steering wheel being mounted upon the bushing, opposed faces of the bushing and steering wheel being provided with grooves adapted to register, a member slidably mounted on the post within the jacket, a pin carried by said member and movable within the grooves of the bushing and wheel when said grooves are in register to lock the wheel to the bushing, an eccentric supported within the jacket, the periphery of said eccentric contacting with the member, means exteriorly of the jacket for rotating the eccentric, means for constantly urging the member toward the eccentric, and means for locking the eccentric against rotation.

4. A locking mechanism comprising, in combination with a steering post, a steering post column and a steering wheel, of a jacket secured to the upper portion of the column, a bushing extending through a wall of the jacket and fixed to the steering post, the steering wheel being mounted upon the bushing, opposed faces of the bushing and steering wheel being provided with grooves adapted to register, a member slidably mounted on the post within the jacket, a pin carried by said member and movable within the grooves of the bushing and wheel when said grooves are in register to lock the wheel to the bushing, an eccentric supported within the jacket, the periphery of said eccentric contacting with the member, means exteriorly of the jacket for rotating the eccentric, means for constantly urging the member toward the eccentric, and means for locking the eccentric against rotation when in one of two positions.

5. A locking mechanism comprising, in combination with a steering post, a steering post column and a steering wheel, of a jacket secured to the upper portion of the column, a bushing extending through a wall of the jacket and fixed to the steering post, the steering wheel being mounted upon the bushing, opposed faces of the bushing and steering wheel being provided with grooves adapted to register, a member slidably mounted on the post within the jacket, a pin carried by said member and movable within the grooves of the bushing and wheel when said grooves are in register to lock the wheel to the bushing, an eccentric supported within the jacket, the periphery of said eccentric contacting with the member, means exteriorly of the jacket for rotating the eccentric, means for constantly urging the member toward the eccentric, and key operated means for locking the eccentric against rotation.

In testimony whereof I hereunto affix my signature.

THOMAS W. BELL.